Figure 1:
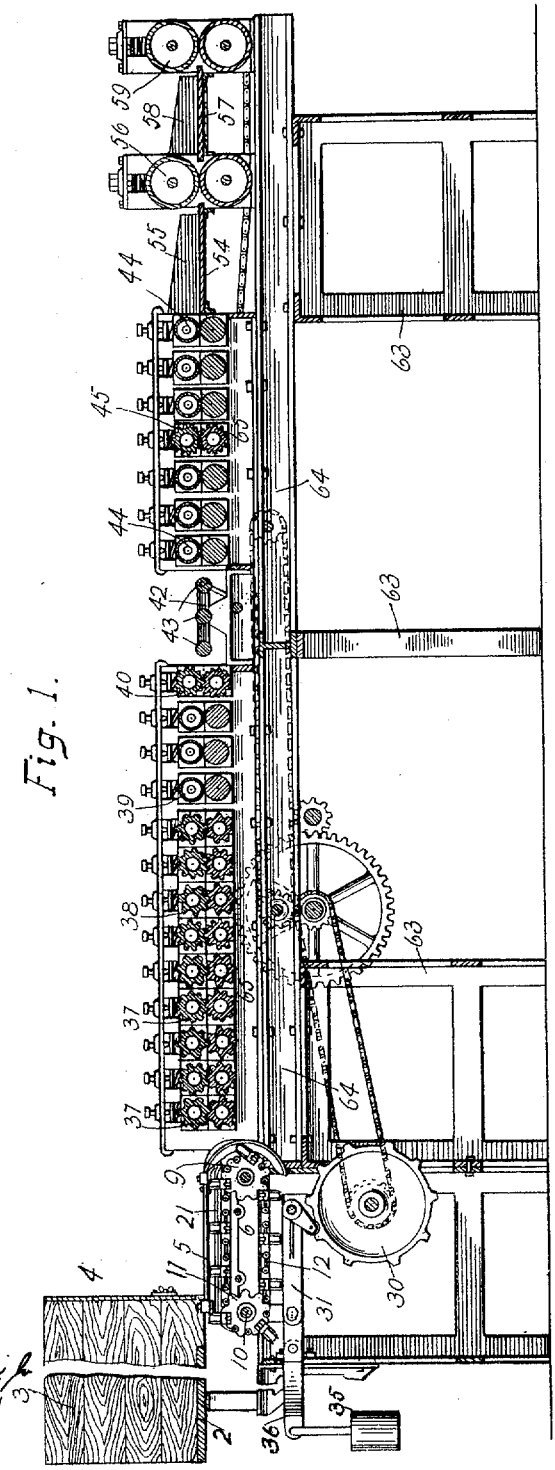

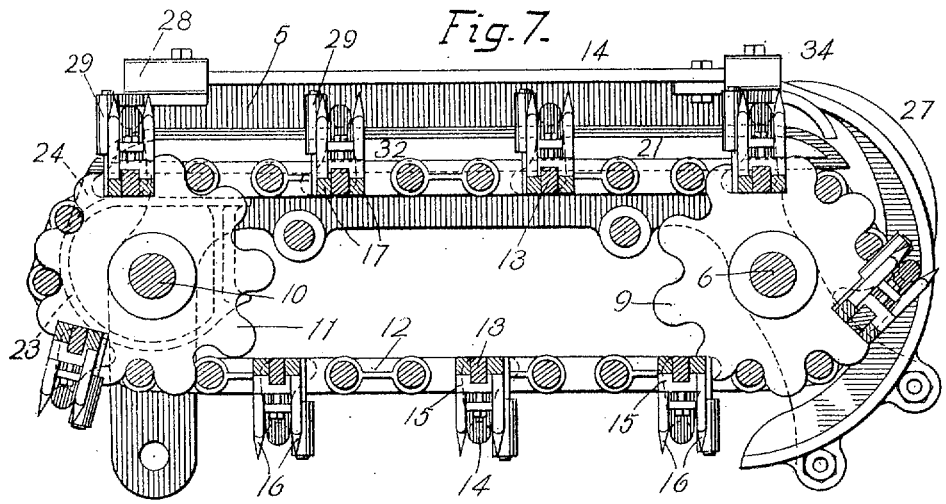
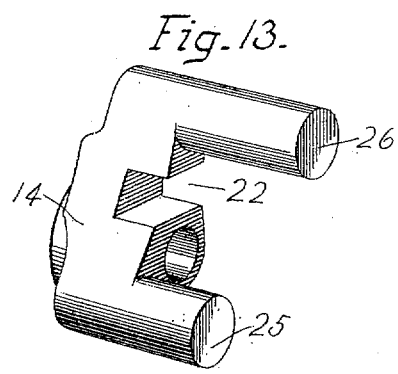
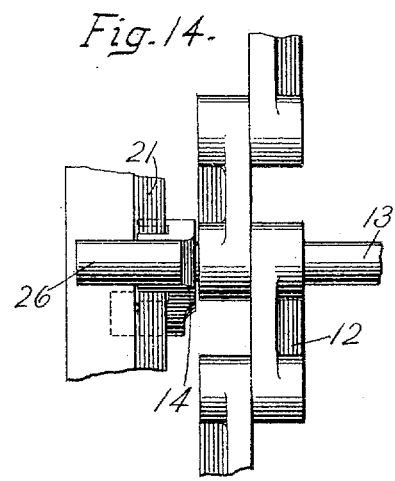

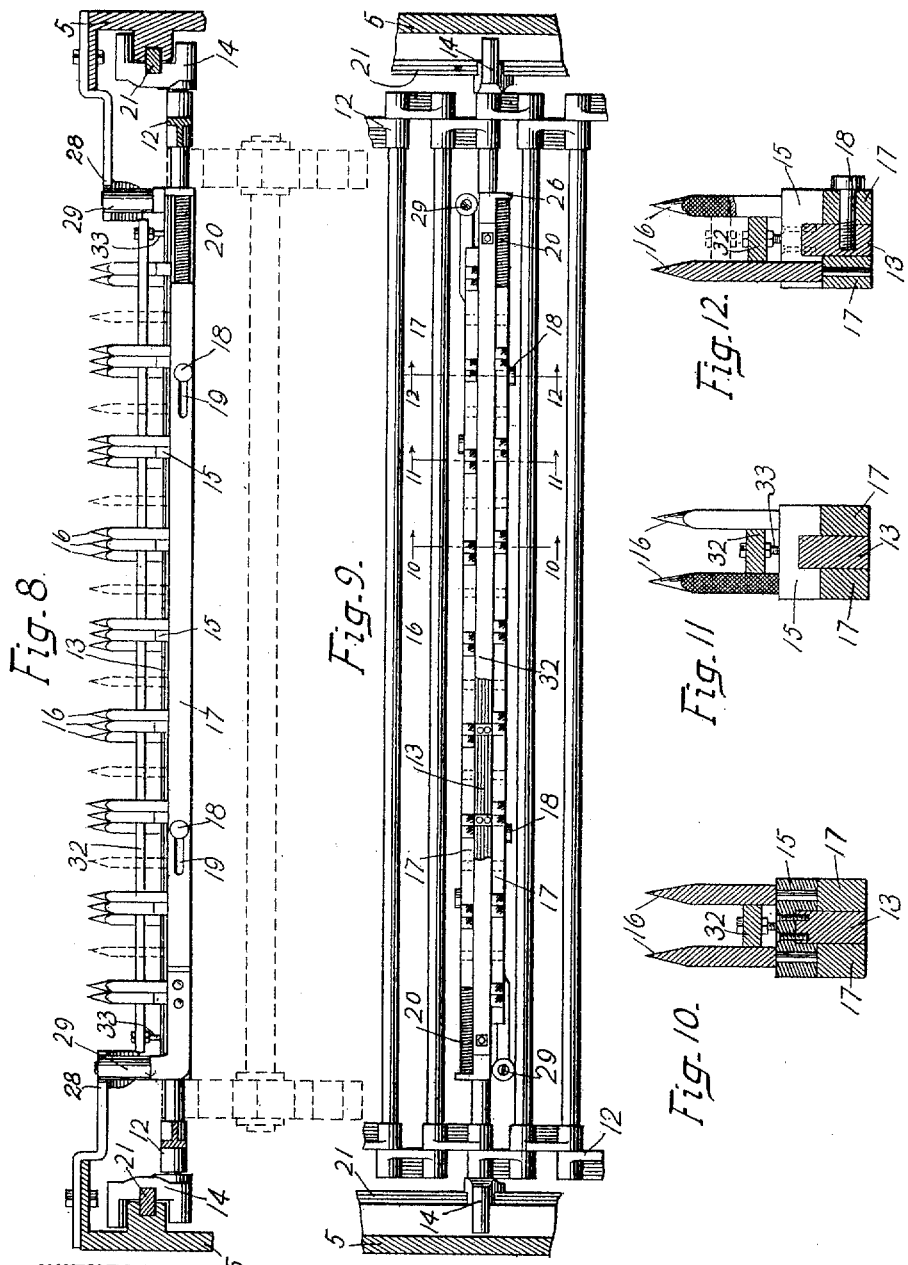

UNITED STATES PATENT OFFICE.

BERTRAND S. SUMMERS, OF CHICAGO, ILLINOIS, ASSIGNOR TO THE SUMMERS FIBER COMPANY, OF CHICAGO, ILLINOIS, A CORPORATION OF WEST VIRGINIA.

FIBER-CLEANING MACHINE.

988,150. Specification of Letters Patent. Patented Mar. 28, 1911.

Application filed January 9, 1903. Serial No. 138,399.

*To all whom it may concern:*

Be it known that I, BERTRAND S. SUMMERS, citizen of the United States, residing at Chicago, in the county of Cook and State of Illinois, have invented a certain new and useful Improvement in Fiber-Cleaning Machines, of which the following is a full, clear, concise, and exact description, reference being had to the accompanying drawing, forming a part of this specification.

My invention relates to improvements in machines for treating fiber.

It has for one of its objects to design a breaking and scutching mechanism which will thoroughly segregate the woody and cellular tissue from the stalks and leave the fiber of the staple in a condition for commercial purposes.

Another object of my invention is to uniformly feed the breaking and scutching mechanism with a continuous body of the staple being treated.

Also, it is the purpose of my invention to provide mechanism for forming the fibers into a continuous sliver ribbon or band for spinning or other uses after they have been treated.

In the embodiment of my invention illustrated in the accompanying drawings, the stock is fed to the machine in a continuous body or stream. After the stalks have been broken they are rubbed upon one another to remove the broken wood from the fibers, and then the cleaned fibers are formed into a ribbon or band.

Figure 2:
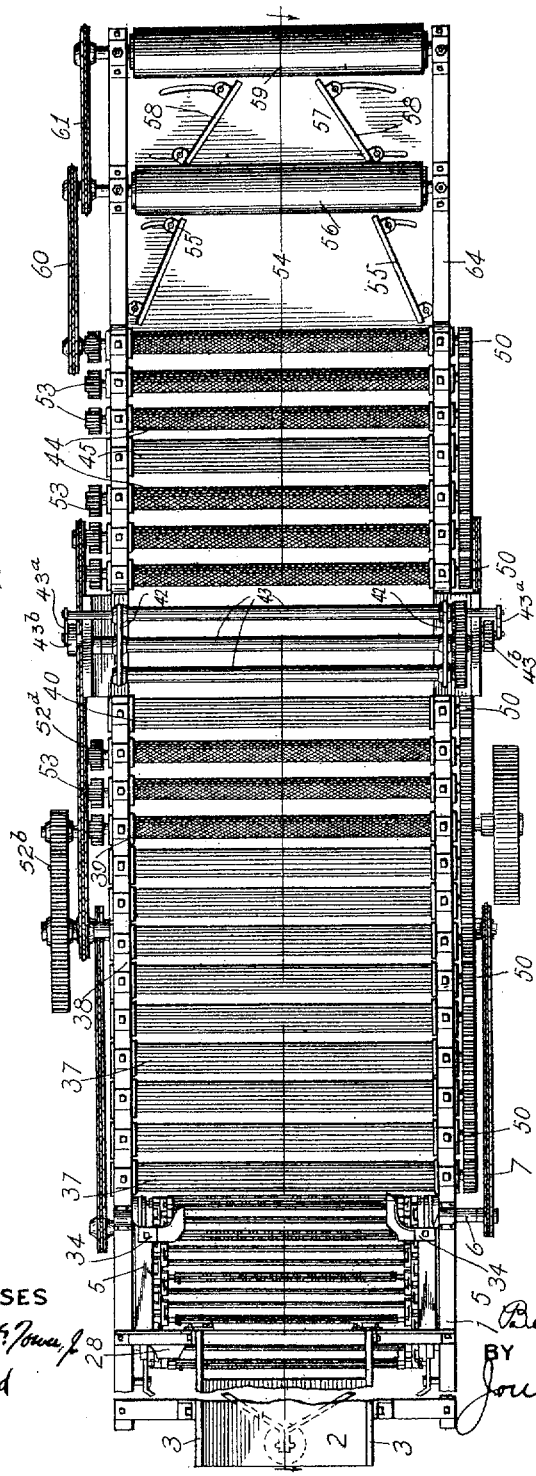
Figure 3:
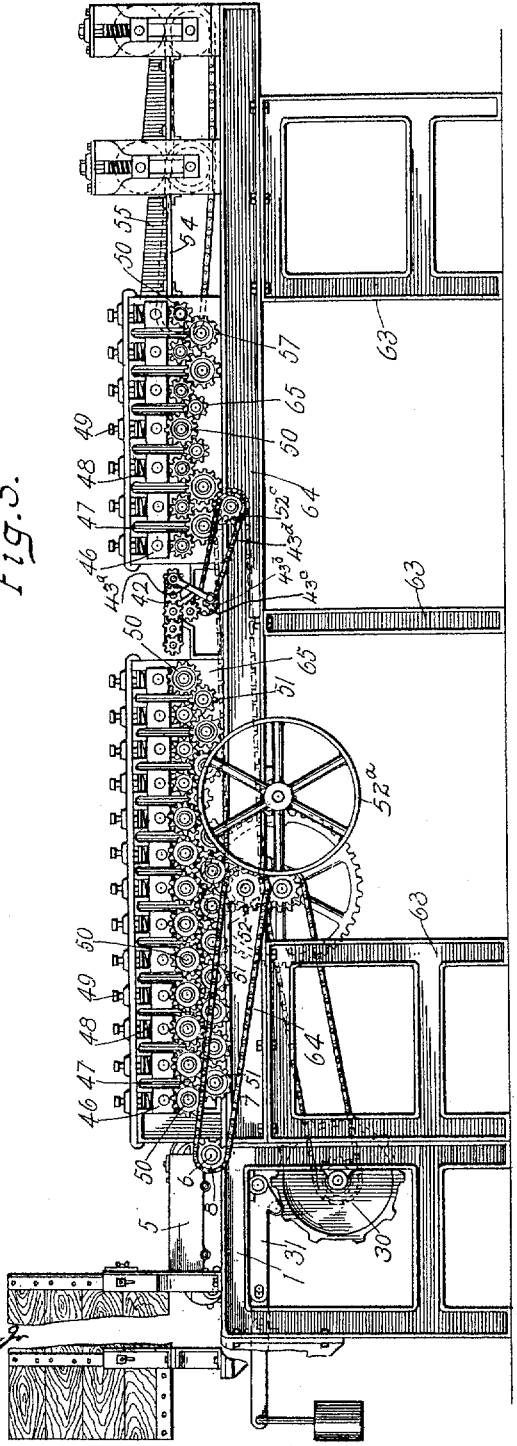
Figure 4:
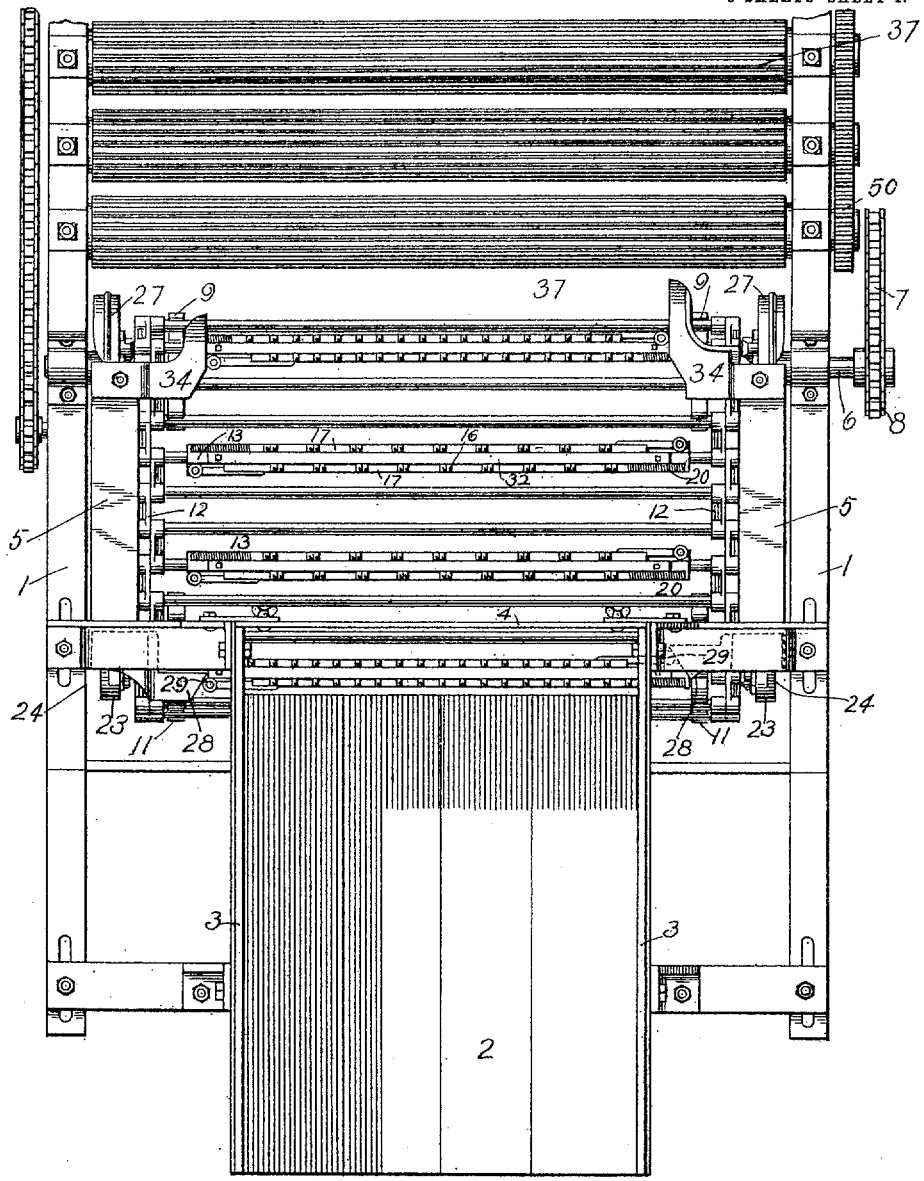
Figure 5:
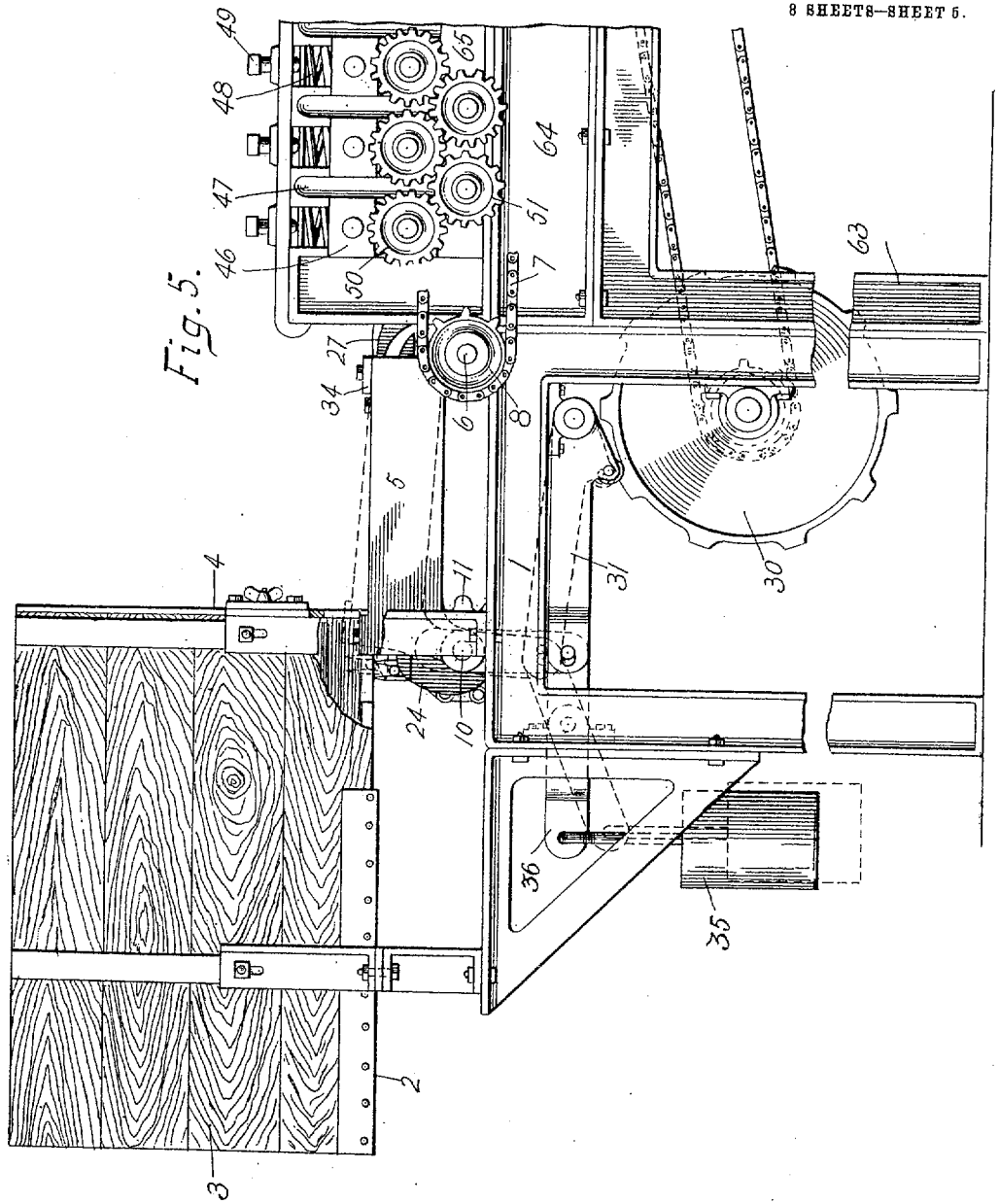
Figure 6:
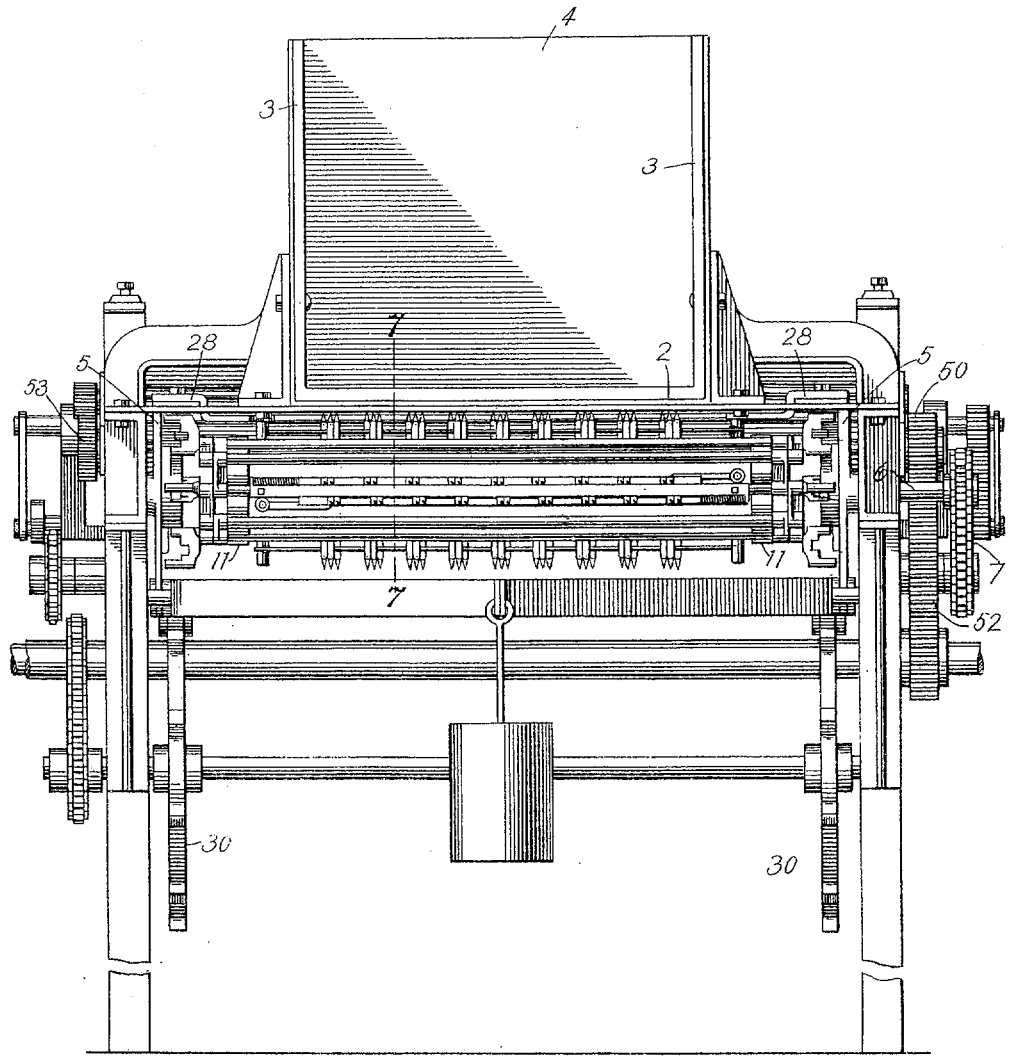

Referring now to the drawings, in which like reference characters designate similar and corresponding parts, the several views therein shown, are as follows:

Figure 1 is a longitudinal vertical section taken through a machine embodying my improvements; Fig. 2 is a plan view thereof; Fig. 3 is a side elevation of my invention; Fig. 4 is an enlarged plan view showing the end of the machine wherein is located the feeding mechanism; Fig. 5 is a side elevation of the same part of the machine as is shown in Fig. 4; Fig. 6 is a view looking at the end of the machine from which the stock is fed; Fig. 7 is an enlarged longitudinal vertical sectional view taken through a portion of the feeding mechanism on the line 7—7 of Fig. 6; Fig. 8 is a view showing in detail the finger or pin bar for gripping the stock. Fig. 9 is a plan view of a portion of the feeding mechanism showing more particularly the part shown in Fig. 8; Figs. 10, 11 and 12 are cross-sections taken through one of the finger or pin bars on the lines 10—10, 11—11 and 12—12, respectively, of Fig 9; Fig. 13 is a perspective view of one of the guiding dogs for the finger bars; and, Fig. 14 is a plan view showing one of the dogs in position on its track.

In constructing a machine embodying my invention in its preferred form, I first provide a suitable support and at the forward end thereof arrange an adjustable shelf 2, on which the stock to be fed to the machine is stacked, between, preferably, upright boards 3 at the sides of said shelf. The stalks of the staple are laid upon the shelf with their ends projecting beyond the rear edge of the shelf, and a board 4, preferably supported by the side boards 3, limits the distance said stalks may project. A feeding mechanism takes the stock from the shelf and delivers it to the breaking and scutching mechanism which is arranged in the middle of the frame. After the fibers have passed through the breaking and scutching mechanism, a mechanism located at the rear end of the frame gathers the fibers and forms them into what is termed a sliver ribbon or band. These three mechanisms will be described in the order of the operation of the machine.

*Feeding mechanism.*—Beneath the shelf 2, and just in the rear thereof, is located the feeding mechanism. It is arranged within a suitable frame 5, which is pivoted at its rear end on a shaft 6. Said shaft is journaled at opposite sides of the support 1 for the machine, and is driven by a chain 7 passing over a sprocket wheel 8 on the end of said shaft. Disposed apart upon said shaft 6, and within the pivoted frame 5, are two sprocket wheels 9. At the forward end of said pivoted frame is journaled another shaft 10, which carries sprocket wheels 11 arranged similarly to those upon the other shaft. These sprockets carry two chains 12, between which extend a series of preferably rectangular bars 13, which have their ends journaled in suitable bearings on the chains. The journaled ends of said bars are preferably extended beyond the chains, and are provided with dogs 14 for controlling the position of the bars or rods.

On the top of each of the bars 13 is arranged a series of brackets 15, which support on opposite sides of the bars 13 upright pointed pins or fingers 16. On both sides of each of said bars is slidably mounted a bar or rod 17, which is supported on pins 18 passing through slots 19 in said bar 17. Said pins are, preferably, threaded in the middle bar 13 and are provided with heads to retain the outer bar in position thereon. Each of the outer bars carries a series of pins similar to those carried by the middle bar. The pins on the outer bars are arranged so that they may be brought into proximity with the pins on the middle bar, or separated therefrom, by moving the outer bars. All of said pins are, preferably, pointed and have their meeting surfaces roughened or knurled. The outer bars are adapted to be moved in opposite directions to separate the pins supported thereby from the pins on the middle bar, and coiled springs 20 interposed between the ends of the outer bars, and lugs on the middle bar normally press the pins on the outer bars against their corresponding pins on the middle or central bar.

When the shaft 6 is rotated, it will run the chains 12 carrying the pin bars. The pin bars at the top of the chains will be held in such a position by the tracks 21 upon which the dogs 14 slide, said dogs being provided with slots 22 to receive said tracks, that the pins upon said bars will stand in an upright position. In the movement of the pin bars to the top of the chain, the dogs are guided to the tracks 21 by cams 23 and 24 on which slide, respectively, short and long arms 25 and 26 of the dogs. In leaving the tracks the dogs are guided by the long arms thereof engaging the cams 27.

In the beginning of the movement of each of the pin bars along the top of the chain, the pins will be separated or opened by the engagement of the cams 28 with the arms 29 on the ends of the outer sliding bars. At the same time a cam wheel 30 operates the lever 31 to raise the swinging end of the pivoted frame 5 and thereby insert the open pins into the stock between the ends of the stalks projecting beyond the edge of the shelf 2. While the pins are in this position, they are permitted to close and thereby grip a layer of stalks. The frame 5 now being lowered, the layer of stalks which is caught by the pins commences to be removed from the shelf, but before it is entirely removed therefrom the pins upon a succeeding pin-bar are protruded through the trailing ends of the former layer of stalks and grip another layer of stalks. The two layers of stalks are thus overlapped. In this way the feeding mechanism forms a continuous layer or stream of stalks and carries it forward to the breaking rolls. The board 4 arranged beyond the rear of the shelf keeps the upper portion of the bulk of the stock from being disturbed or moved from its position while the bottom layers thereof are being withdrawn. At the rear end of the pivoted frame are cams 34 adapted to operate the outer pin-bars to open the pin and thereby permit the stream of stalks to pass on to the breaking rolls. A balance weight 35, connected by lever 36 with the end of the frame 5, relieves the lever 31 and cam 30 of the greater amount of the weight of said frame, so that the power required to operate the frame is reduced to a minimum.

*Breaking and scutching mechanism.*—Just in rear of the feeding mechanism is arranged a train of pairs of interacting grooved rolls 37, for breaking the wood in the stalks of fiber. In this train of rolls pairs of finely grooved and pairs of coarsely grooved rolls are preferably arranged alternately. Following the rolls 37 are pairs of finely grooved rolls 38. Behind the breaking rolls are a train of pairs of rolls 39, preferably having knurled peripheral surfaces. In the art it is generally understood that knurled surfaces upon metal are formed by compression and I prefer to form the knurled surfaces upon the rods in this way, as then no sharp edges will exist to cut the fibers. The upper roll of each pair of knurled rolls is preferably speeded faster than the lower roll, and made hollow in order that it may bear very lightly on the lower roll if it be so desired. A pair of very fine grooved breaking rolls 40 follow the knurled rolls, and then comes a frame which is adapted to rock or vibrate. Said frame consists of pivoted end pieces 42, between which are supported a number of rolls 43. One end of each of said end pieces 42 has pivoted thereto a link 43$^a$ which is eccentrically pivoted to a wheel 43$^b$. This wheel is mounted upon a shaft 43$^c$ driven by a chain 43$^d$. When said sprocket is rotated it oscillates or rocks said frame through the links connected therewith. In rear of the rocking frame are arranged two sets of pairs of knurled rolls 44 similar to those heretofore described, and between said sets of knurled rolls is arranged another pair of very fine grooved rolls 45. The lower rolls of the various pairs of rolls of the breaking and scutching mechanism are journaled in fixed bearings, while the upper rolls are journaled in movable bearings 46 which slide between guides 47. Coiled springs 48 are placed upon said movable bearings, and adjusting screws 49 are adapted to regulate the tension of the springs and thereby vary the pressure between the rolls.

On one end of each of the lower rolls is a spur gear 50, and an idler 51 meshes with each of said spur gears to transmit movement from one to the other of said rolls in the same direction. The gear 52 meshes with one of the idlers of the front train of rolls of the breaking and scutching mechanism, and has its shaft driven from the shaft of the driving pulley 52$^a$ by interacting gears 52$^b$. The gear 52$^c$ for operating the rear train of rolls of the breaking and scutching mechanism meshes with one of the idlers of said rear train of rolls, and said gear is driven from the shaft of gear 52 by a chain 52$^d$. The interaction of the grooved rolls of each pair serves to operate the upper grooved rolls. The upper knurled rolls, however, are operated by meshing spur gears 53 on the ends of the knurled rolls opposite the spur gears 50. In order to speed the upper knurled rolls faster than their corresponding lower rolls, the upper spur gears 53 are smaller than the lower ones. The same effect which is produced upon the stalks and fibers by running the corresponding upper and lower knurled rolls at different speed, and which is hereinafter set forth, may be attained by giving said rolls different surface speeds in any way.

The feeding mechanism feeds the stalk in a continuous layer or body to the breaking rolls, as heretofore described. As the stalks pass between the first pairs of breaking rolls they are coarsely broken. By reason of the alternating pairs of rolls being differently grooved, the thorough breaking of the stalks is insured. The fine grooved rolls break the wood of the stalk into very small pieces. Of course, in the breaking mechanism some of the wood is separated from the stalks, but a great deal thereof still adheres to the fibers. The fibers now pass between the knurled rolls. The upper knurled rolls moving faster than the lower ones, cause the broken stalks to rub upon one another longitudinally. This removes some more of the wood from the fibers. Next, the fibers pass between the following very fine grooved rolls. As the fibers come from this pair of breaking rolls they are shaken by the rocking frame which separates any loose particles of wood therefrom, and are carried onward by the revolving rolls 43. The differently speeded knurled rolls of the last train again cause relative movement of the fibers upon one another, and thereby all of the woody or cellular tissue is thoroughly rubbed from the fibers. The knurled rolls are particularly suited for this purpose, as they readily grip the stalks to impart relative movement thereto and do not cut or sever the fibers.

The manner of grooving and arranging the rolls, as herein shown and described, insures the thorough breaking of the stalks, and the rubbing of the fibers upon one another removes all the wood therefrom. Also, said arrangement of rolls and the interposition of the rocking frame between the sets of rolls separates the wood from the fiber as soon as it is loosened, and thereby the danger of said loose particles of wood cutting the fiber as it passes through the succeeding rolls is avoided.

In this machine it is desirable to have a continuous uniform layer of the stock to pass therethrough, not only for the purpose of increasing the capacity of the machine and to have the fibers overlapped in the ribbon so that it will not part or break, but also to make certain of rubbing the stalks and fibers throughout their entire length.

*Mechanism for forming the ribbon band.*— As the prepared fibers issue from the breaking and scutching mechanism they move over a table 54 between converging adjustable guides 55, which bring the fibers together. Next, said fibers are pressed between rolls 56. A second table 57 follows the rolls 56, and as the fibers pass thereover the ribbon is narrowed by the guides 58 similar to the guides 55, and any rough edges are turned in by said guides 58 so that said ribbon will be of uniform width throughout its length. Then finally the ribbon is again pressed between rolls 59.

The pressing rolls have bearings similar to the bearings of the rolls of the breaking and scutching mechanism. The lower pressing roll 56 is driven from the last lower roll 44 of the breaking and scutching mechanism, by chain 60, and the lower pressing roll 59 is driven from the lower pressing roll 56 by chain 61. The upper pressing rolls 56 and 59 are driven from their corresponding lower rolls by frictional contact therewith. The structure for supporting the several mechanisms preferably consists of a frame work provided with legs 63 and having parallel beams 64, which run lengthwise from one end of the frame to the other. Upon said beams are secured the standards 65 which carry the bearings for the various rolls and the rocking frame. Said standards are made in sections and are secured to said beams, preferably, by bolts in such manner that they may be adjusted along said beams, when it is desired to change the number of pairs of rolls. In the operating feeding mechanism the springs will cause the pins to grip an entire layer of the stock, even though the amount of stock between some of the pins is less than between the others, for said springs by their action will compress the greater amount of stock between some of the pins until the lesser amount of stock between the other pins is gripped.

There are many changes which may be made in the details of construction, arrangement and combination of parts here shown and described, without in any way departing from the spirit of my invention.

Having described my invention what I claim as new and desire to secure by Letters Patent is:

1. The combination with means for treating fibrous stalks to clean the fibers, of means for receiving the stock, feeding mechanism for feeding said stock to said means, and means for advancing said feeding mechanism bodily to the stock and retracting the same therefrom so as to cause said mechanism to grip successive layers of stock, said feeding mechanism being so constructed and operated as to overlap said layers to form a continuous ribbon or stream of stalks.

2. The combination with means for treating fibrous stalks to clean the fibers, of means for receiving the stock, a feeding mechanism having a plurality of rows of traveling clamps, means for advancing said mechanism bodily to the stock to insert said clamps into the same, means for causing each row of clamps to grip a layer of stock and feed it to the aforesaid means, said rows of clamps being so arranged as to overlap the successive layers of stock to form a continuous stream or ribbon of stalks.

3. The combination with a fiber cleaning mechanism, of a support for receiving the stock, a feeding mechanism having a plurality of rows of traveling clamps, means for advancing said mechanism bodily to the stock and retracting same therefrom at predetermined intervals, means for causing each row of clamps to take a layer of stock from said support and carry it forward to said cleaning mechanism, said rows of clamps being so arranged as to overlap the successive layers of the stock to form a continuous stream or ribbon of stalks.

4. The combination with a fiber cleaning mechanism, of a support for receiving the stock, clamps for gripping and feeding the stock to said cleaning mechanism, a movable frame for carrying said traveling clamps, means for operating said frame to advance said clamps to said stock and retract the same therefrom so as to cause each clamp to grip a layer of stock, said clamps being so arranged as to overlap the successive layers of stock to form a continuous stream or ribbon of stalks.

5. The combination with a fiber cleaning mechanism, of a support for receiving the stock, a plurality of rows of traveling clamps for feeding the stock to said cleaning mechanism, a movable frame for carrying said traveling clamps, means for operating said frame to advance each row of clamps to said stock and retract the same therefrom so as to make each row of clamps grip a layer of the stock, said clamps being so arranged as to overlap the successive layers of stock to form a continuous stream or ribbon of stalks.

6. The combination with a fiber cleaning mechanism, of a support for receiving the stock, a movable frame, traveling chains carried by said frame, clamps carried by said chains, means for operating said frame to advance said clamps to said stock, means for causing said clamps to grip layers of the stock and carry the same from said support to said cleaning mechanism, said clamps being so arranged as to overlap said layers to form a continuous stream of stalks.

7. The combination with a fiber cleaning mechanism, of a support for the stock, traveling clamping fingers, a movable frame for carrying said fingers, means for operating said frame to insert said fingers into said stock, and means for causing said fingers to grip layers of the stock, said fingers being so arranged as to overlap said layers to form a continuous stream of stalks.

8. The combination with cleaning mechanism, of a hopper for the stock, a movable frame, traveling clamping fingers carried by said frame, means for operating said frame to insert said clamping fingers into the stock, means for causing said fingers to grip the stock, and means for causing said fingers to release the stock, said fingers being so arranged as to overlap said layers to form a continuous stream of stalks.

9. The combination with fiber cleaning mechanism, of a support for the stock, a feeding mechanism having traveling clamping fingers running between said support and said cleaning mechanism and adapted to carry the stock from said support to said cleaning mechanism, means for advancing said feeding mechanism to the stock and retracting same therefrom at predetermined intervals, means for causing said fingers to grip successive bundles of the stock, said fingers being so arranged as to overlap successive bundles of the stock to form a continuous ribbon or stream of stalks.

10. The combination with a fiber cleaning mechanism, of a support for receiving the stock, traveling clamping fingers running between said support and said cleaning mechanism and adapted to withdraw layers of stock from said support and feed the same to said cleaning mechanism, a movable frame for carrying said fingers, means for operating said frame to insert said fingers into the stock, means for causing said fingers to grip the stock, said fingers being so arranged as to overlap successive layers of the stock to form a continuous ribbon or stream of stalks, and means for causing said fingers to release said layers.

11. The combination with a fiber cleaning mechanism, of a support for receiving the stock, a movable frame, traveling chains carried by said frame, clamping fingers carried by said chains, means for operating said frame to insert said fingers into the stock, means for causing the fingers to grip successive layers of the stock, said fingers being so arranged as to overlap said layers to form a continuous stream of stalks, and means for causing said fingers to release said layers.

12. The combination with a fiber cleaning mechanism, of a support for receiving the stock, a movable frame, traveling chains carried by said frame, a plurality of rows of clamping fingers carried by said chains, means for operating said frame to insert each row of clamping fingers into said stock as it approaches said support, means for causing each row of clamping fingers to grip a layer of stock, said fingers being so arranged as to overlap said layers to form a continuous stream of stalks, and means for causing said fingers to release said layers as the same are fed to said cleaning mechanism.

13. The combination with means for treating fiber, of means for holding a stock of stalks of fiber, a pivoted frame, a feeding mechanism having means to grip the stalks and supported by said frame, and means for moving the swinging end of said frame to advance said mechanism to the stock.

14. The combination with means for treating fiber, of a suitable support for a stock of stalks of fiber, a feeding mechanism having means adapted to carry the stalks from said support to the first mentioned means, a movable frame supporting said mechanism, and means for operating said frame to remove successive layers of the stalks from said box one by one.

15. The combination of a plurality of traveling bars carrying a series of pins, a second bar slidably mounted upon each of the aforesaid bars and also carrying a series of pins, and means for operating the last mentioned bar to move the pins carried thereby.

16. The combination with a suitable support for a stock of stalks of fiber or other material, of a movable frame, a series of traveling pins carried by said frame and adapted to be moved toward or away from each other, and means for moving said frame to insert said pins in the stock.

17. In a machine for treating fibers, the combination with a breaking and scutching mechanism, of a frame adapted to shake broken wood from the fibers and having driven rollers to carry the fibers over said frame.

18. In a machine for treating fiber, the combination with sets of breaking and scutching rolls, of a centrally pivoted frame arranged between said sets of rolls, and having suitably driven rolls to receive the fiber and carry the same between said sets of rolls, and means for rocking said frame to shake the broken wood from the fiber.

19. In a machine for treating fiber, the combination with a set of breaking rolls, of a set of knurled rolls adapted to relatively move the stalks or fibers upon one another to rub the wood from the fibers, and a rocking frame adapted to shake the broken wood from the fibers.

20. In a fiber cleaning machine, in combination, a support for receiving a stock of stalks, a breaking mechanism having a plurality of pairs of breaking rolls, a feeding mechanism having a plurality of traveling clamps and arranged between said support and said breaking rolls, means for advancing said feeding mechanism to said stock of stalks and retracting same therefrom at predetermined intervals, said clamps being operated to grasp successive layers of stalks and feed a continuous stream of stalks to said breaking rolls, a plurality of pairs of roughened rolls following said breaking rolls, one roll of each pair of roughened rolls being run at a different surface speed from the other roll of said pair, and means for forming the fibers into a ribbon or band after the same issue from said roughened rolls.

21. In a fiber cleaning machine, in combination a support, for a stock of stalks, a breaking mechanism having a plurality of pairs of coarsely grooved rolls and a plurality of pairs of finely grooved rolls, said pairs of coarsely grooved rolls and said pairs of finely grooved rolls being arranged alternately, a feeding mechanism arranged between said breaking mechanism and said support adapted to feed a continuous stream of stalks to said breaking mechanism, a plurality of pairs of roughened rolls following said breaking mechanism, one roll of each pair of roughened rolls being run at a different surface speed from the other roughened roll of said pair, means for shaking the broken wood from the fiber, and means for forming the fiber into a ribbon or band after it issues from said roughened rolls.

In witness whereof, I have hereunto subscribed my name in the presence of two witnesses.

BERTRAND S. SUMMERS.

Witnesses:
W. CLYDE JONES,
EDWIN B. H. TOWER, Jr.

---

Copies of this patent may be obtained for five cents each, by addressing the "Commissioner of Patents, Washington, D. C."